G. W. DEISE.
NUT LOCK.
APPLICATION FILED AUG. 11, 1915.
1,160,389.
Patented Nov. 16, 1915.
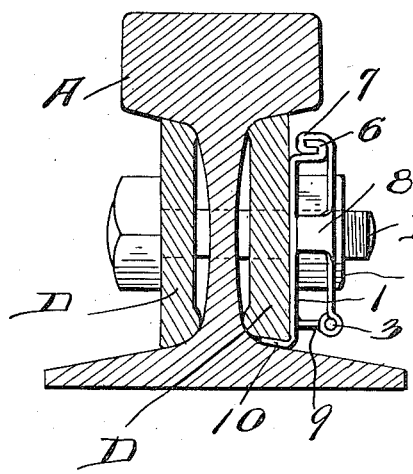
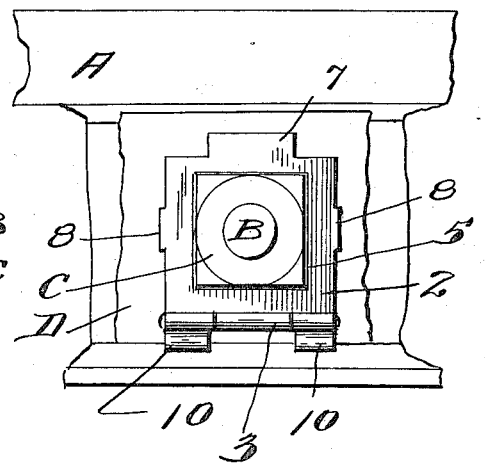
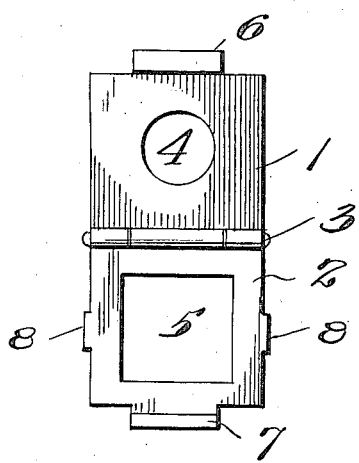
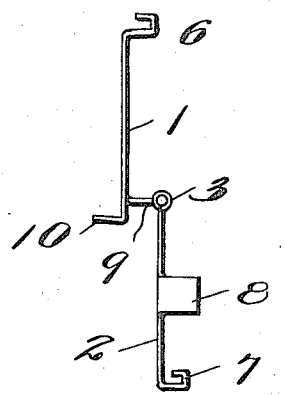
Witnesses
C. K. Davis.
Inventor
GEORGE W. DEISE
By Thomas Harmon
Attorney

UNITED STATES PATENT OFFICE.

GEORGE W. DEISE, OF LOCK HAVEN, PENNSYLVANIA.

NUT-LOCK.

1,160,389. Specification of Letters Patent. Patented Nov. 16, 1915.

Application filed August 11, 1915. Serial No. 45,025.

*To all whom it may concern:*

Be it known that I, GEORGE W. DEISE, a citizen of the United States of America, residing at Lock Haven, in the county of Clinton and State of Pennsylvania, have invented certain new and useful Improvements in Nut-Locks, of which the following is a specification.

My present invention relates to improvements in nut locks, designed especially for use on railroads and in connection with the fish plate of the rail joint.

The primary object of the invention is the provision of a locking device for the purpose of preventing backward turning of the nut on its bolt due to continual vibrations and jars, and the invention contemplates a locking device which shall be comparatively cheap in cost of production, durable, and economical and efficient in operation.

The invention consists in certain novel combinations and arrangements of parts whereby the locking device is secured to the fish plate and the nut secured on the bolt, as will be hereinafter described and claimed.

In the accompanying drawings I have illustrated one complete example of the physical embodiment of my invention constructed according to the best mode I have so far devised for the practical application of the principles of the invention.

Figure 1 is a sectional view through a rail and its fish plates showing the bolt and the nut locked thereon by my device. Fig. 2 is a side view of Fig. 1. Fig. 3 is an elevation view of the hinged locking device, opened, and Fig. 4 is an edge view of Fig. 3.

In illustrating the preferred embodiment of my invention I have employed the standard railroad rail A, the usual bolt B, nut C and fish plates D, D, as a means of showing the applicability of the invention to the nut and bolt, and fish plate.

The nut locking device is made up of two metallic plates 1 and 2, preferably of resilient sheet steel, and joined together by the hinge joint 3. The plate 1 is provided with a round opening 4 to encompass a bolt as B, and the plate 2 is formed with a central, squared opening 5 of sufficient size to fit over the usual bolt-nut C. The free ends of these plates 1 and 2 are formed with hooks 6 and 7 respectively so that they may clasp over each other as in Fig. 1 and hold the plates in locked position.

Space lugs 8 8 are formed integral with the plate 2 at its sides, and it will be noted, in Figs. 1 and 4, that a web 9 projects from the plate 1 to form part of the hinge joint 3. These space lugs and the web hold the locking device in spaced position with relation to the plates, and a pair of feet 10 10 are formed to project from the lower corners of the plate 1 and fit under the fish plate D as in Fig. 1.

In using the locking device, the plate 1 is slipped over the free end of the bolt before the nut C is applied to the bolt, with the hinged plate 2 hanging loosely below the bolt. The nut is now turned home and the plate 1 is clamped between the nut and fish plate with the feet 10 fitting securely under the fish plate. The plate 2 is now turned up on its hinge joint and the squared opening 5 passed over the nut C. The two hooks 6 and 7 are snapped into contact and the plates are securely held with the spacing lugs 8 8 bearing on the plate 1 and these lugs together with the web 9 hold the locking plate securely in position at the proper distance from the clamped plate 1. In order to displace the locking device, the hooks 6 and 7 must be unclasped before the plate 2 can be turned down free of the nut.

What I claim is:

1. A nut locking device comprising a pair of hinged plates each having an end clasping hook, one of said plates having a web spacing the hinge joint therefrom and formed with a round opening for a bolt, the other plate having a nut opening and spacing lugs to hold the plates apart, and one of said plates having feet adapted to fit under a fish plate.

2. The combination with a rail, fish plate, bolt and its nut of a locking device comprising a pair of hinged plates having end clasping hooks, one of said plates fitted over the bolt and formed with feet secured under the fish plate and a web extending from said plate to the hinge joint, and the other plate having a squared opening to fit over the nut and provided with spacing lugs engaging the first mentioned plate.

In testimony whereof I affix my signature.

GEORGE W. DEISE.